(12) United States Patent
Milner et al.

(10) Patent No.: US 7,216,184 B2
(45) Date of Patent: May 8, 2007

(54) SYSTEM AND METHOD FOR IDENTIFICATION OF DEVICES ASSOCIATED WITH INPUT/OUTPUT PATHS

(75) Inventors: Tom Milner, Meadow Vista, CA (US); David McDougall, Newcastle, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 326 days.

(21) Appl. No.: 09/846,645

(22) Filed: May 1, 2001

(65) Prior Publication Data

US 2002/0166002 A1    Nov. 7, 2002

(51) Int. Cl.
G06F 3/00   (2006.01)
G06F 13/00  (2006.01)

(52) U.S. Cl. ............... 710/10; 710/8; 710/15; 710/16

(58) Field of Classification Search ............ 707/103 R, 707/103.4, 100, 200; 709/217, 229, 203, 709/202, 207, 223–226; 710/15, 29, 2, 3, 710/4, 62, 72, 74, 8, 10, 16

See application file for complete search history.

(56) References Cited

U.S. PATENT DOCUMENTS

| | | | | |
|---|---|---|---|---|
| 6,122,639 | A * | 9/2000 | Babu et al. | 707/103 R |
| 6,288,716 | B1 * | 9/2001 | Humpleman et al. | 709/203 |
| 6,332,142 | B1 * | 12/2001 | LeBlanc | 707/100 |
| 6,496,837 | B1 * | 12/2002 | Howard et al. | 707/200 |
| 2001/0020254 | A1 * | 9/2001 | Blumenau et al. | 709/229 |
| 2002/0161852 | A1 * | 10/2002 | Allen et al. | 709/217 |

OTHER PUBLICATIONS

Deitel and Deitel, C++ How to Program, 1994, Prentice Hall, 3rd Edition, chapters 4, 5, 6, and 15.*
Kruse and Ryba, Data Structures and Program Design in C++, 1999, Simon and Schuster, 1st Edition, Chapters 4, 7, and 9.*

* cited by examiner

*Primary Examiner*—Kim Huynh
*Assistant Examiner*—Joshua D. Schneider

(57) ABSTRACT

The present invention is directed to a system and method which discovers or identifies a type of device associated with an input/output (I/O path). Preferred embodiments define a type of device by a property file. The property file is utilized to identify executable code that determines whether the device associated with a particular I/O path is the type of device defined by said property file.

23 Claims, 3 Drawing Sheets

```
# LSI_FC60.def ← 301
#    /      \
  301a      301b
Name:       HP SureStore E Disk Array FC60
Alias:      Optimus Prime
Vendor:     Hewlett-Packard
PartNumber: A5277A
Family:     Storage
Type:       DiskArray
Icon:       fcdiskarray.32.gif

# Device Management
OnManage:
            302
# Discovery /
ScsiModelDiscovery:      HPA5277A
ScsiModelDiscoveryClass: LSI_FC60
                              \
# Status        303
Target:     SCSI: %remote_host: "%dev_file"
DeviceClass:
```
300

SYSTEM AND METHOD FOR IDENTIFICATION OF DEVICES ASSOCIATED WITH INPUT/OUTPUT PATHS

TECHNICAL FIELD

The present invention generally relates to identification of devices associated with input/output (I/O) paths and more particularly to such identification wherein the devices are disposed on a storage area network (SAN).

BACKGROUND

Enterprise resource planning systems and other sophisticated corporate data processing systems have gained substantial importance in recent years. Specifically, many corporate management theories posit that the success of an organization is directly related to the ability to gather and process enterprise information in an efficient and organized manner. To fulfill these goals, certain software companies have produced information management products. These types of software systems manage enormous amounts of information. Management of inventory levels, customer purchasing information, accounting data, employment information, and various other databases requires significant storage capacity. In addition, e-commerce has placed a premium upon transferring ordinary business operations to electronic work flows, thereby creating further storage capacity requirements. In addition, increased processing speed and capacity places greater demands upon storage resources.

To provide significant storage capacity for information management and other applications, storage area networks (SANs) have been developed. A storage area network typically separates storage capacity from the communication medium utilized in a computer network. For example, client devices and server devices may be communicatively coupled via a communication medium such as a local area network (LAN), a wide area network (WAN), and/or the like. The clients may access various applications on the servers to perform organization activities such as accounting, payroll, ordering, and other tasks. The servers may utilize data stored on various storage devices to implement these applications. To avoid unduly taxing the bandwidth of the communication medium utilized for the clients and the servers, another communication medium is utilized for communication between the servers and the storage devices. For example, a Fibre Channel network may be utilized. In such an arrangement, the input/output operations associated with accessing data on storage devices do not impact the clients.

Although this approach does produce performance increases in terms of application efficiency, the arrangement necessarily involves a degree of complexity. In general, the process of structuring and managing a SAN can be quite intensive. For SAN administrators, adding new devices into a heterogeneous storage network typically requires an update/upgrade to the management software to allow the new devices to be discovered and managed by the software, this process can be time consuming and expensive.

SUMMARY OF THE INVENTION

The present invention is directed to a system and method which discovers or identifies a type of device associated with an input/output (I/O path). Preferred embodiments define a type of device by a property file. The property file is utilized to identify executable code that determines whether the device associated with a particular I/O path is the type of device defined by said property file.

DETAILED DESCRIPTION

Figure 1:
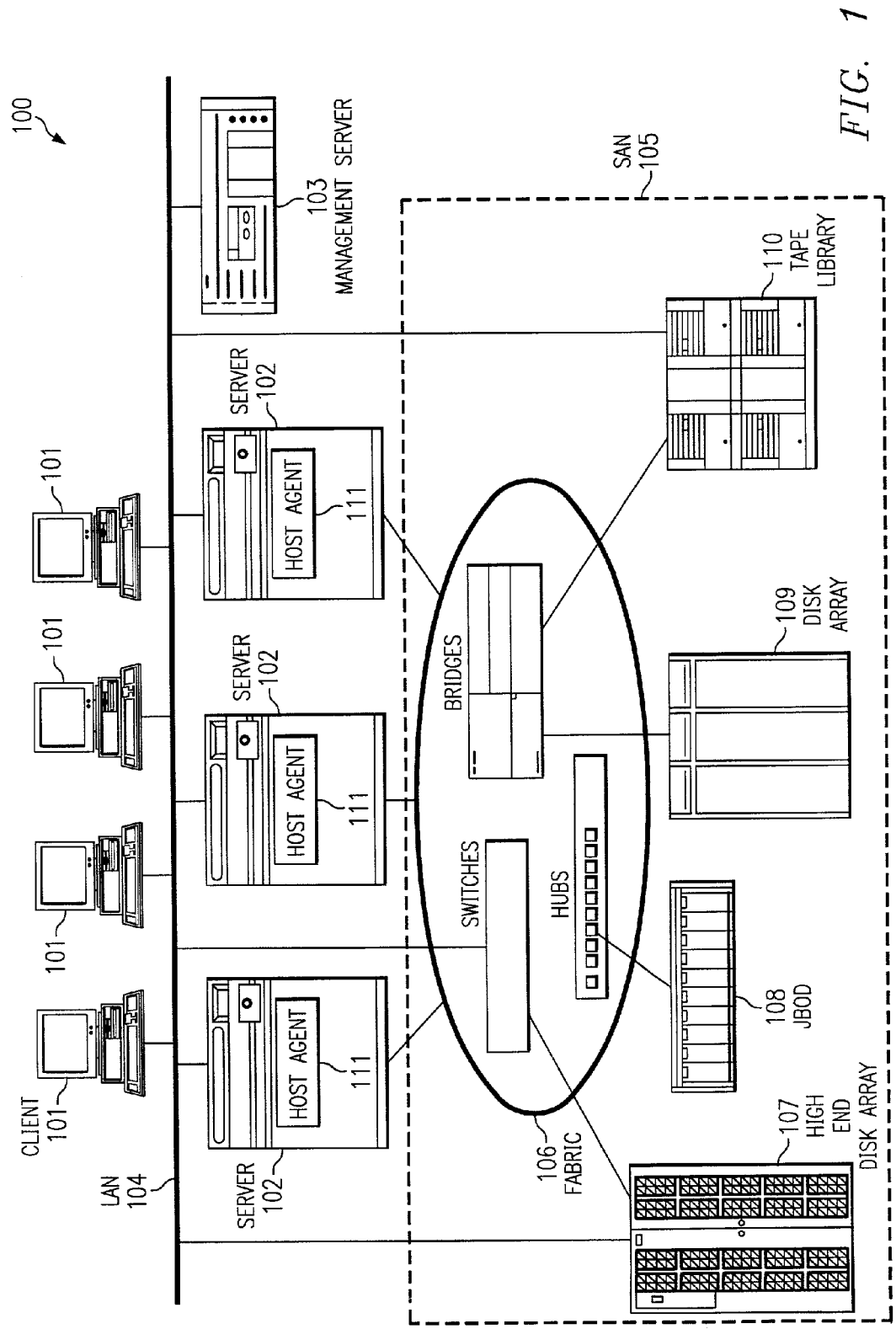
FIG. 1 depicts an exemplary system including a storage area network arranged according to a preferred embodiment of the present invention.

FIG. 1 depicts exemplary system 100 including storage area network (SAN) 105 arranged according to a preferred embodiment of the present invention. System 100 includes a plurality of clients 101. Clients 101 provide a user interface for various applications (such as accounting, purchasing, order fulfillment, payroll, human resource, and/or other applications) for an organization. These types of applications are implemented by servers 102. Clients 101 are communicatively coupled to servers via local area network (LAN) 104. LAN 104 may be implemented utilizing any number or combination of communication mediums and protocols. For example, LAN 104 may be implemented using an Ethernet configuration, a Fibre Channel configuration, wireless configuration, and/or the like. It shall further be appreciated that the present invention is not limited to LANs. Instead, clients 101 may be disposed on a metropolitan area network (MAN), wide area network (WAN), or a larger network if desired.

To implement the various applications, servers 102 access data stored on and retrieve data from SAN 105. To retrieve and store data, servers 102 are communicatively coupled to a plurality of storage devices (high end disk array 107, just a bunch of disks (JBODs) 108, disk array 109, and tape library 110 as examples).

Fabric 106 is disposed to communicatively couple servers 102 and the various storage devices. Fabric 106 may include any number of hubs, bridges, switches, routers, and/or the like. Fabric 106 may be implemented to allow any server of servers 102 to access any particular storage device. Moreover, fabric 106 may provide redundant paths between servers 102 and the various storage devices. It shall be appreciated that fabric 106 may assume any network topology structure. Fabric 106 may be implemented utilizing a point-to-point topology, a point-to-multipoint topology, a ring topology, a star topology, or any combination thereof. Fabric 106 may utilize any number of communication mediums and protocols. Fabric 106 may be implemented utilizing an Ethernet configuration, a Fibre Channel configuration, a wireless configuration, and/or the like. It shall further be appreciated that certain portions of SAN 105 may be disposed at further distances. For example, SAN 105 may utilize a T-1 or SONET connection in fabric 106 to mirror data to a remote site for redundancy purposes.

The arrangement of system 100 is quite advantageous for several reasons. First, the data is stored behind servers 102. Specifically, data retrieval or storage by servers 102 on the various storage devices does not affect clients 101. Each of the various storage devices are interconnected with each of servers 102. By doing so, a single server failure will not cause a significant amount of data to be inaccessible. Moreover, system 100 provides scalable storage capacity. When additional storage capacity is needed, new storage devices may be connected to fabric 106 and various configuration tasks may be performed to facilitate access to the new storage devices.

System 100 further includes management server 103. Management server 103 allows a SAN administrator to manage SAN 105 via a user interface on management server 103 or one of clients 101. Management server 103 may also automatically perform administration tasks utilizing policy driven criteria. For example, data paths may be reconfigured in the event of a broken communication link. Additionally, data paths may be automatically added or removed to allocate bandwidth to particular applications or users to minimize waiting time or to perform other desired goals.

To facilitate SAN management, it is appropriate to provide a mechanism for automatic discovery and identification of devices disposed with SAN 105. The phrases "device discovery" and "device identification" refer to the process of examining an input/output (I/O) path and determining what device is associated with the I/O path. Examples of I/O paths that are typically utilized in SANs include a host logical unit number (LUN) or a simple network management protocol (SNMP) address. A host logical unit number is defined by an open system protocol designed to coordinate communication or to define logical connections between a host and a plurality of I/O paths associated with various devices. SNMP facilitates network management by coordinating communication of control information in protocol data units between SNMP agents and an SNMP manager device.

For example, each of servers 102 include host agent 111 in this preferred embodiment. Host agent 111 may be implemented as an executable program that exists as a running process or service on each of servers 102. Host agent 111 provides an Application Programming Interface (API) which is used by management server 103 to communicate with host agents 111. Host agent 111 has a generic storage device discovery engine which provides the information required by the management server 103 to allow it to discover and manage storage devices. For example, host agent 111 may query devices pursuant to SCSI protocols to obtain pertinent device information. Host agent 111 may gather any other type of information to be returned to management server 103. The information to be returned may include, but is not limited to, LUN path information, vendor ID, product ID, serial number and product revision.

Figure 2:
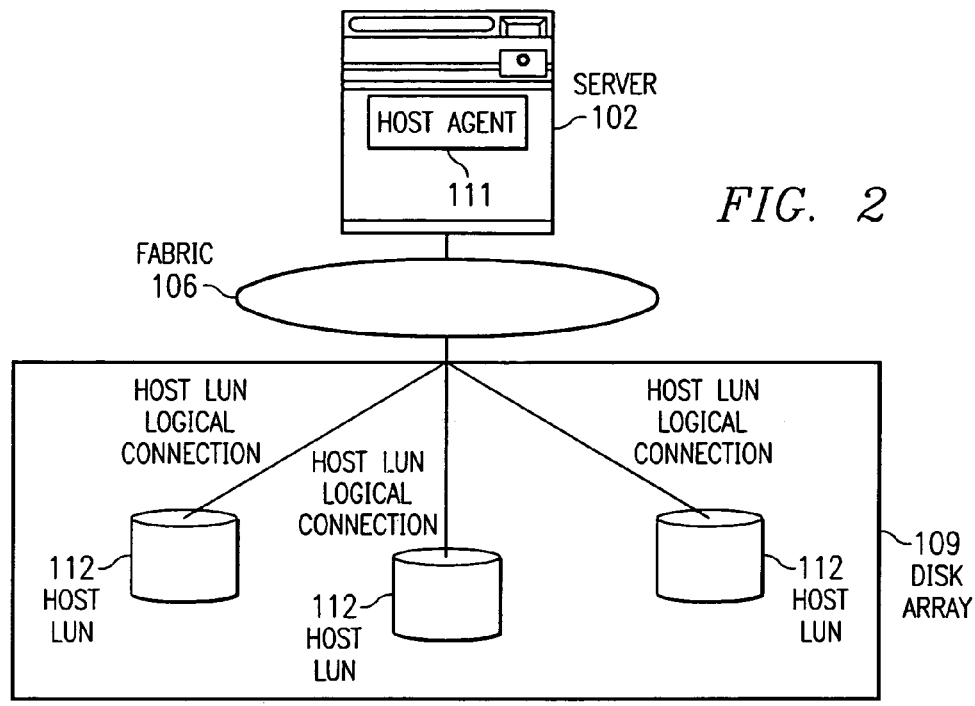
FIG. 2 depicts an exemplary host agent arrangement according to a preferred embodiment of the present invention.

FIG. 2 depicts an exemplary host agent arrangement according to a preferred embodiment of the present invention. Host agent 111 is shown as being communicatively coupled to disk array 109 via fabric 106. Additionally, host agent is show as being communicatively coupled to a plurality of host LUNs 112 of disk array 109 via host LUN logical connections. It shall be appreciated that the use of host LUN logical connections may be appropriate if a storage element is a controller supporting multiple sub-units (such as certain redundant array of independent disks (RAID) subsystems for example) or if the element also supports a separate control or management interface.

Preferred embodiments are also operable to perform device discovery for devices associated with SNMP agents. SNMP agents are interfaces to devices managed via the SNMP protocols. SNMP agents may be embedded into various devices such as disk array 109 for example. SNMP agents are operable to facilitate control of associated devices in response to commands issued from a manager. Preferred embodiments cause management server 103 to implement the manager functionality in accordance with SNMP protocols. In accordance with preferred embodiments of the present invention, SNMP agents associated with storage devices of SAN 105 are operable to return the device domain name server (DNS) identifier or IP address and the SNMP system object identifier to facilitate device discovery.

Figure 3:
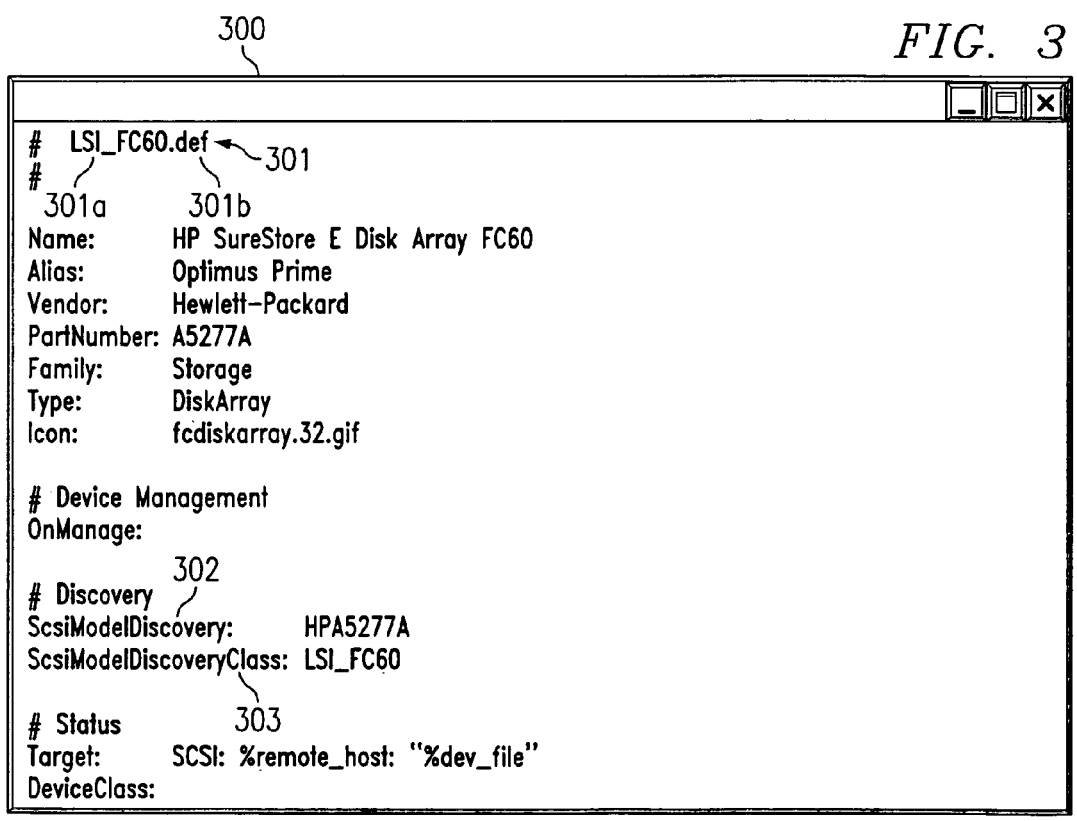
FIG. 3 depicts a property file according to a preferred embodiment of the present invention.

Moreover, management server 103 makes use of property files to identify or discover devices disposed within SAN 105. FIG. 3 depicts exemplary property file 300. Property file 300 includes a plurality of fields and information. Property file 300 includes property file name 301. The property file name preferably utilizes a keyword (301a) and operand (301b). Additionally, property file 300 includes a discovery model field 302. Discovery model field 302 defines the particular device associated with property file 300. In this case, the type of device is defined to be HPA5277A. Property file 300 further includes discovery class field 303. It shall be appreciated that different fields may be utilized or provided. For example, property file 300 defines a particular type of discovery field and discovery class. Namely, the information set forth in property file 300 is related to a SCSI device type. Depending on the type of device, a discovery field and a discovery class may alternatively or additionally be included for a SNMP device type. It shall be appreciated that property file 300 is merely exemplary. Any type of format or other data structure may be utilized to contain appropriate information for the device discovery process.

Every discovery class preferably implements two methods. Every class preferably implements an is Claimed( ) method. Also, every class preferably implements a getInstanceID( ) method.

The getInstanceID( ) method returns a unique identifier that may be used to reference a device associated with a particular I/O path. For example, the getInstanceID( ) method may return a concatenated string of the SCSI vendor ID, product ID, and serial number of SCSI devices. Similarly, getInstanceID( ) method may return the IP address for an SNMP device.

The is claimed( ) method is utilized to determine whether the device associated with the particular I/O path is described by the respective property file. First, the isClaimed( ) method receives via arguments information permitting the method to query a device associated with a given I/O path if necessary. For example, the argument information may be supplied to a SCSI gateway daemon associated with host agent 111 of FIG. 1 to perform device queries if necessary for identification purposes. Such information may include a device file or host file. Alternatively, the IP address may be utilized as a method argument to allow querying via SNMP protocols for an SNMP device.

When the is Claimed( ) method is called with arguments identifying a particular I/O path and device, the isClaimed( ) method determines whether the device matches the device described by the particular property file. For example, the isClaimed( ) method of a default SCSI discovery class examines the vendor ID and product ID actually obtained from the device communicatively coupled via the particular I/O path. The default SCSI isClaimed( ) method concatenates the actual vendor ID and product ID. The default isClaimed( ) method compares the concatenated result to the information set forth in the discovery model field of the respective property file. If the information matches, it is concluded that the device is described by the respective property file which causes the isClaimed( ) method to return a value of true. If the information does not match, the isClaimed( ) method returns a value of false. For SNMP devices, the default isClaimed( ) method may compare the system object ID with the value of string operand of the SNMP model discovery keyword in the property file.

Property files such as property file 300 are preferably written into a set of property files in a predefined directory when devices are added to SAN 105. In particular, a SAN administrator may execute an installation program when a new device is added to SAN 105. When the installation program installs various drivers and the like, the installation program preferably writes a property file associated with the particular device into a predetermined location for further retrieval by management server 103. It shall be appreciated that there should preferably be at least one property file per type of device disposed on SAN 105.

When management server 103 initiates device discovery operations, management server 103 loads all property files into an array. Management server 103 reads each property file in the array and instantiates a property object according to the property class field. If the property class field is not provided or is empty, an object of a default discovery class is preferably instantiated. Additionally, a handle or pointer to the instantiated class is preferably placed into the array. In a preferred embodiment, three arrays will be present. Specifically, one array contains the class information removed from the property files. The next array contains handles to the SCSI discovery class objects as defined by the class information. The other array contains the handles to the SNMP discovery class objects as defined by the class information.

Management server 103 then examines each I/O path. Management server 103 examines each I/O path by utilizing the device information actually obtained from the devices respectively associated with such I/O paths. As previously noted this information may include DNS identifier, IP address, vendor ID, product ID, serial number, and/or firmware revision. Additionally, it shall be noted that such information obtained from devices is preferably cached. Caching of information is particularly helpful, since certain devices (such as a large disk array) may comprise thousands of host LUNs. Thus, caching of information will allow subsequent identification method calls to occur more efficiently.

For each host LUN reported, management server 103 passes the pertinent information to each isClaimed( ) method of SCSI discovery class objects utilizing the handles in the appropriate array. Management server 103 is thereby able to identify the devices on the host LUNs. Specifically, management server 103 determines that a particular type of device is associated with an I/O path when the isClaimed( ) method defined by the property file of that type of device returns a true value. Likewise, for each I/O path defined by an IP address, management server 103 calls the SNMP discovery class objects by the handles in the appropriate array. When a device is identified, management server 103 calls the getInstanceID( ) of the appropriate object to associate a unique identifier with the particular device.

After examining each LUN and IP address I/O path, management server 103 has identified the specific type device associated with the I/O paths by use of the property files. Any information necessary to manage or operate the devices may be obtained directly or indirectly from their respective property files. Also, a unique identifier is associated with each device to facilitate such management or operation.

It shall be appreciated that the present invention provides numerous advantages. First, preferred embodiments of the present invention do not require modification of the main management server code to provide an update or upgrade. Instead, preferred embodiments allow an update or upgrade to occur by inserting or placing the new property file(s) and discovery class(es) into the appropriate directory. The addition of the new property file(s) and discovery class(es) will cause the operations of management server code to automatically recognize the property file(s) and discovery class(es) when the management server code is restarted. This allows loading of new drivers or software updates and upgrades to occur without shutting down the system.

Moreover, the present invention provides an open protocol to allow developers to create new devices for use within SANs without requiring coding changes to the SANs. In particular, device developers are only required to provide logical instructions directed toward their specific devices if identification of their specific devices varies for any reason. For instance, a device may be discoverable by both SCSI and SNMP objects. In this case, the getInstanceID( ) methods of the SCSI and SNMP discovery classes for this type of device should be operable to return the same unique ID regardless of the I/O path upon which the device is discovered. Custom discovery classes may be written by device developers to ensure that devices are properly discovered or identified. The arguments passed to the methods of the custom discovery classes allow the various methods to perform any type of querying necessary to properly perform their desired functionality. Moreover, it shall be appreciated that custom discovery classes for specific devices do not change the operation of the identification procedure as a whole. Thus, customization of discovery does not require modification of management server code or host agent code.

When implemented via executable instructions, various elements of the present invention are in essence the code defining the operations of such various elements. Specifically, it shall be appreciated that the aforementioned classes are object oriented code that operate on processor based systems via their various methods. Software or code operating on a processor or processors may implement operations of host agent 111 of FIG. 1. Certain code may be operable to query devices associated with various LUNs to gather device information pursuant to SCSI protocols. Likewise, code may be operable to implement SNMP protocols.

The executable instructions or code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 4:
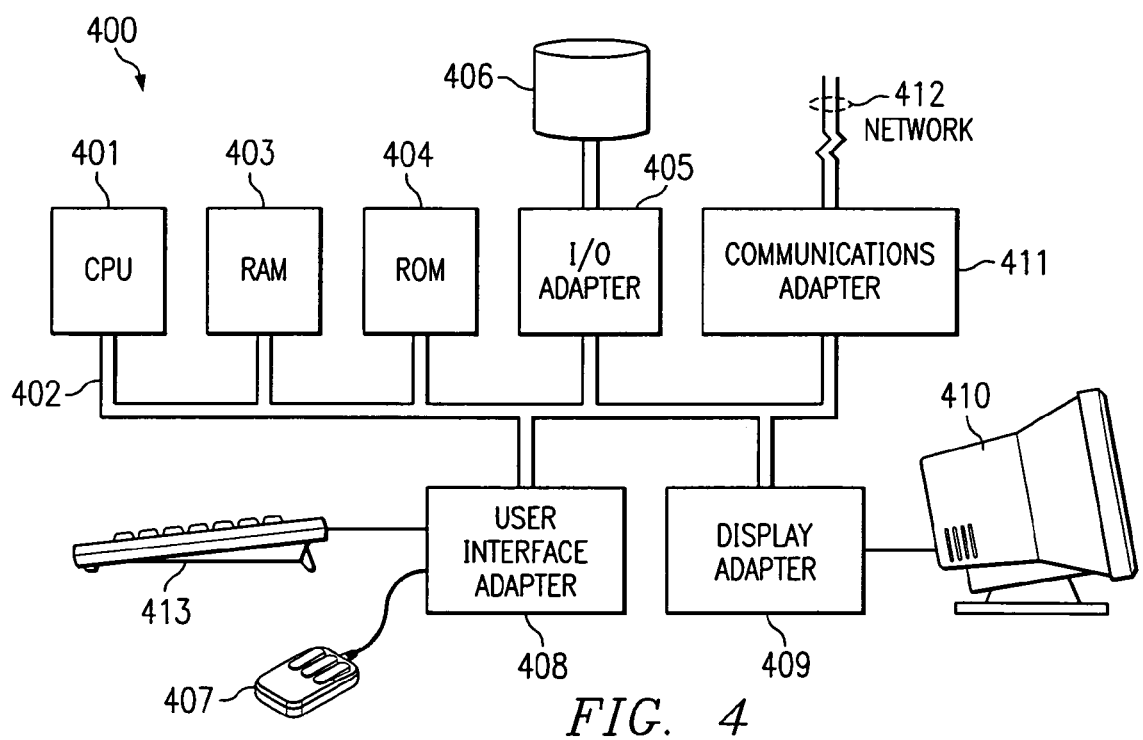
FIG. 4 depicts a block diagram of a computer system which is adapted to use the present invention.

FIG. 4 illustrates processor based system 400 adapted according to embodiments of the present invention. Various devices associated with the present invention may utilize the architecture of processor based system 400, including but not limited to servers 104 and management server 103. Central processing unit (CPU) 401 is coupled to system bus 402. CPU 401 may be any general purpose CPU, such as an Intel Pentium processor. However, the present invention is not restricted by the architecture of CPU 401 as long as CPU 401 supports the inventive operations as described herein. CPU 401 executes the various operations such as the aforementioned methods of the various classes. Processor based system 400 includes BUS 402. Processor based system 400 also includes random access memory (RAM) 403, which may be SRAM, DRAM, or SDRAM. Processor based system 400 includes ROM 404 which may be PROM, EPROM, or EEPROM. RAM 403 and ROM 404 hold user and system data and programs as is well known in the art.

Processor based system 400 may further comprise various input/output (I/O) devices to communicate with a user. For example, processor based system 400 may communicate I/O information to a SAN administrator to facilitate management of SAN 105. Processor based system 400 includes I/O controller card 405, communications adapter card 411, user interface card 408, and display card 409. I/O controller card 405 connects to storage devices 406, such as one or more of hard drive, CD drive, floppy disk drive, tape drive, to processor based system 400. Communications card 411 is adapted to couple processor based system 400 to network 412 which may be part of or coupled to LAN 104, for example. User interface card 408 couples user input devices, such as keyboard 413 and pointing device 407, to processor based system 400. Display card 409 is driven by CPU 401 to control the display on display device 410.

What is claimed is:

1. A method for discovering a type of device associated with an input/output (I/O) path of a storage area network, comprising:
   (a) retrieving a plurality of property files from a predefined subdirectory, wherein each property file of said plurality of property files describes a type of device;
   (b) removing a class identifier from each property file of said property files, wherein each class identifier identifies a class;
   (c) creating an object of the respective class of each class identifier; and
   (d) calling a specific method, from a plurality of methods, for each created object, wherein said specific method is operable to determine whether a device associated with said I/O path is the type of device described by the property file associated with said object.

2. The method of claim 1 further comprising:
   (e) adding a new storage device to said storage area network, wherein said new storage device is caused to be associated with said I/O path, and wherein said new storage device is a new type of device to said storage area network;
   (f) storing a new property file in said predefined subdirectory describing said new type of device; and
   (g) restarting code of a management server to thereby cause repetition of steps (a)–(d) utilizing said new property file.

3. The method of claim 1 wherein a default property file of said plurality of property files identifies a default small computer system interface (SCSI) class, wherein said default SCSI class defines a method to identify devices by comparing SCSI vendor identifier and product identifier information to at least one field in said default property file.

4. The method of claim 1 wherein a default property file of said plurality of property files identifies a simple network management protocol (SNMP) class, wherein said default SNMP class defines a method to identify devices by a comparing a SNMP system object identifier to at least one field in said default property file.

5. A system for analyzing input/output (I/O) paths of a storage area network (SAN) comprising:
   a plurality of servers, wherein said servers are communicatively coupled to a fabric of said SAN;
   a plurality of host agent processes, wherein each of said host agent processes executes on a respective server of said plurality of servers, and wherein said host agent processes are operable to query devices associated with host logical unit numbers I/O paths of said SAN to gather device information;
   a management server, wherein said management server employs a simple network management protocol (SNMP) manager process to query devices associated with SNMP I/O paths of said SAN to gather device information;
   a plurality of property files stored in a predefined directory, wherein each property file of said plurality of property files describes a type of device, and wherein each property file of said plurality of property files includes an identifier of code operable to determine whether a device associated with an I/O path is the type of device described by its associated property file; and
   a management server process, wherein said management server process is operable to receive gathered device information from said plurality of host agent processes and from said SNMP manager process; and wherein said management server process is operable to call code identified by property files with gathered device information as arguments to thereby uniquely identify the devices associated with said I/O paths of said SAN.

6. The system of claim 5 wherein said management server process, includes:
   code for creating an array of identifiers including each said identifier from each property file;
   code for instantiating a plurality of small computer system interface (SCSI) device discovery objects utilizing identifiers from said array that identify SCSI device classes; and
   code for instantiating a plurality of SNMP device discovery objects utilizing identifiers from said array that identify SNMP device classes.

7. The system of claim 6 wherein said management server process includes:
   code for calling a method of each instantiated SCSI device discovery object for each host logical unit numbers I/O path; and
   code for calling a method of each instantiated SNMP device discovery object for each SNMP I/O path.

8. A method for identifying a device associated with an input/output (I/O) path, comprising:
   retrieving device information from a target device associated with said I/O path utilizing a device control protocol;
   retrieving a property file defining a device, wherein said property file designates a code set for identifying, from a plurality of different code sets for identifying;
   executing said designated code, wherein said designated code set utilizes said retrieved information to determine whether said target device is said device defined by said property file.

9. The method of claim 8 wherein said device information is not a SysObjID.

10. The method of claim 8 wherein said property file identifies a class defining said type of device, said method further comprising:
    instantiating an object of said class;
    wherein said step of executing code includes calling a method of said instantiated object.

11. The method of claim 10 wherein said executing code determines that said target device is said type of device, said method further comprising:
    calling a second method of said instantiated object to create a unique identifier for said device.

12. The method of claim 8 wherein said code is operable to query said target device for additional device information.

13. A method for determining the nature of a device associated with an input/output (I/O) path, said method comprising:
retrieving device information from a target device associated with said I/O path utilizing a device control protocol;
retrieving a property defining the nature of a known device;
executing code associated with a property file, wherein said code is operable to uniquely identify said target device, and operable to determine whether or not said property file defines the nature of said uniquely identified device.

14. The method of claim 13 wherein said executed code further determines the device type of said target device.

15. The method of claim 13 wherein the unique identity of said target device is capable of being determined in a plurality of device control protocols.

16. The method of claim 13 wherein said target device is a small computer system interface (SCSI) device, and wherein said step of retrieving said device information includes obtaining a vendor identifier and a product identifier of said target device from a host agent.

17. The method of claim 13 wherein said target device is a simple network management protocol (SNMP) device, and wherein said step of retrieving includes obtaining an SNMP system object identifier of said target device.

18. A system for determining the nature of a target device associated with an input/output (I/O) path, said system comprising:
at least two device identifying code sets, wherein each said code set is operable to identify a different group of devices;
at least two property files, wherein each said property file defines a different device type, and wherein each said property file is associated with a different identifying code set; and
a processor operable to call one said property file and execute said identifying code set associated with said called property file, wherein said identifying code set associated with said called property file determines if said target device is a member of the group defined by said called property file.

19. The system of claim 18 wherein each said identifying code set is capable of uniquely identifying a device.

20. The system of claim 18 wherein the nature of said target device can be determined in a plurality of device control protocols.

21. The system of claim 20 wherein said target device can be uniquely identified regardless of the device control protocol.

22. The system of claim 18 wherein at least one said identifying code set is operable to communicate with a host agent to obtain information utilized to determine whether said target device is the type of device defined by the property file associated with said identifying code set.

23. The system of claim 22 wherein said host agent provides an application programming interface (API) to obtain said information.

* * * * *